United States Patent
Peh et al.

(10) Patent No.: US 11,112,979 B2
(45) Date of Patent: Sep. 7, 2021

(54) RUNTIME MEMORY ALLOCATION TO AVOID AND DELAY DEFECT EFFECTS IN MEMORY SUB-SYSTEMS

(71) Applicant: Micron Technology, Inc., Boise, ID (US)

(72) Inventors: Woei Chen Peh, Singapore (SG); Eng Hong Tan, Pulau Pinang (MY); Andrew M. Kowles, Boise, ID (US); Xiaoxin Zou, Singapore (SG); Zaihas Amri Fahdzan Bin Hasfar, Singapore (SG)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/523,615

(22) Filed: Jul. 26, 2019

(65) Prior Publication Data
US 2021/0026547 A1 Jan. 28, 2021

(51) Int. Cl.
*G06F 3/06* (2006.01)
(52) U.S. Cl.
CPC .......... *G06F 3/0631* (2013.01); *G06F 3/0604* (2013.01); *G06F 3/064* (2013.01); *G06F 3/0652* (2013.01); *G06F 3/0659* (2013.01); *G06F 3/0688* (2013.01)
(58) Field of Classification Search
CPC ...... G06F 3/0631; G06F 3/0604; G06F 3/064; G06F 3/0652; G06F 3/0659; G06F 3/0688; G06F 3/061; G06F 3/0613; G06F 3/0638; G06F 3/0644; G06F 3/0679
See application file for complete search history.

(56) References Cited

U.S. PATENT DOCUMENTS

| | | | | |
|---|---|---|---|---|
| 2007/0081385 A1* | 4/2007 | Huang | ................. | G11C 16/349 365/185.09 |
| 2012/0284587 A1* | 11/2012 | Yu | ......................... | G06F 3/0631 714/773 |
| 2013/0179624 A1* | 7/2013 | Lambert | ............. | G06F 12/0246 711/103 |
| 2013/0238835 A1* | 9/2013 | Liu | ...................... | G11C 29/883 711/103 |

(Continued)

*Primary Examiner* — Michael Krofcheck
(74) *Attorney, Agent, or Firm* — Schwegman Lundberg & Woessner, P.A.

(57) ABSTRACT

Devices, methods, and media are described for runtime memory allocation to avoid defects. One embodiment includes assigning a plurality of memory blocks of a memory sub-system to a plurality of erase groups, such that each erase group of the plurality of erase groups comprises two or more memory blocks of the plurality of memory blocks. A bad block association is determined for each erase group of the plurality of erase groups. Prior to a memory condition being met, memory resources of the memory sub-system are allocated by erase group based on a first set of criteria which are based at least in part on the bad block association for each erase group in order to prioritize use of erase groups with fewer bad blocks. After the memory condition has been met, the memory resources of the memory sub-system are then allocated by erase group according to a second set of criteria, wherein the second set of criteria allocates the memory resources irrespective of bad block association for each erase group after the determining that the memory condition has been met.

20 Claims, 10 Drawing Sheets

(56) References Cited

U.S. PATENT DOCUMENTS

| | | | |
|---|---|---|---|
| 2015/0033087 A1* | 1/2015 | Marquart | G06F 11/1048 |
| | | | 714/718 |
| 2015/0339223 A1* | 11/2015 | Matsudaira | G06F 12/0246 |
| | | | 711/103 |
| 2017/0180477 A1* | 6/2017 | Hashimoto | G06F 12/0246 |
| 2017/0249211 A1* | 8/2017 | Hoei | G11C 29/52 |
| 2018/0217892 A1* | 8/2018 | Syu | G06F 11/104 |
| 2018/0373438 A1* | 12/2018 | Bennett | G06F 3/0652 |
| 2019/0205043 A1* | 7/2019 | Huang | G06F 12/1027 |

* cited by examiner

FIG. 3B

RUNTIME MEMORY ALLOCATION TO AVOID AND DELAY DEFECT EFFECTS IN MEMORY SUB-SYSTEMS

TECHNICAL FIELD

Embodiments of the disclosure relate generally to memory sub-systems and more specifically, to runtime allocation to avoid memory defects in memory sub-systems so that erase groups with bad blocks are not allocated until certain criteria are met.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIGS. 3A-B illustrate aspects of blocks organized into erase groups in accordance with some embodiments.

DETAILED DESCRIPTION

Figure 1:
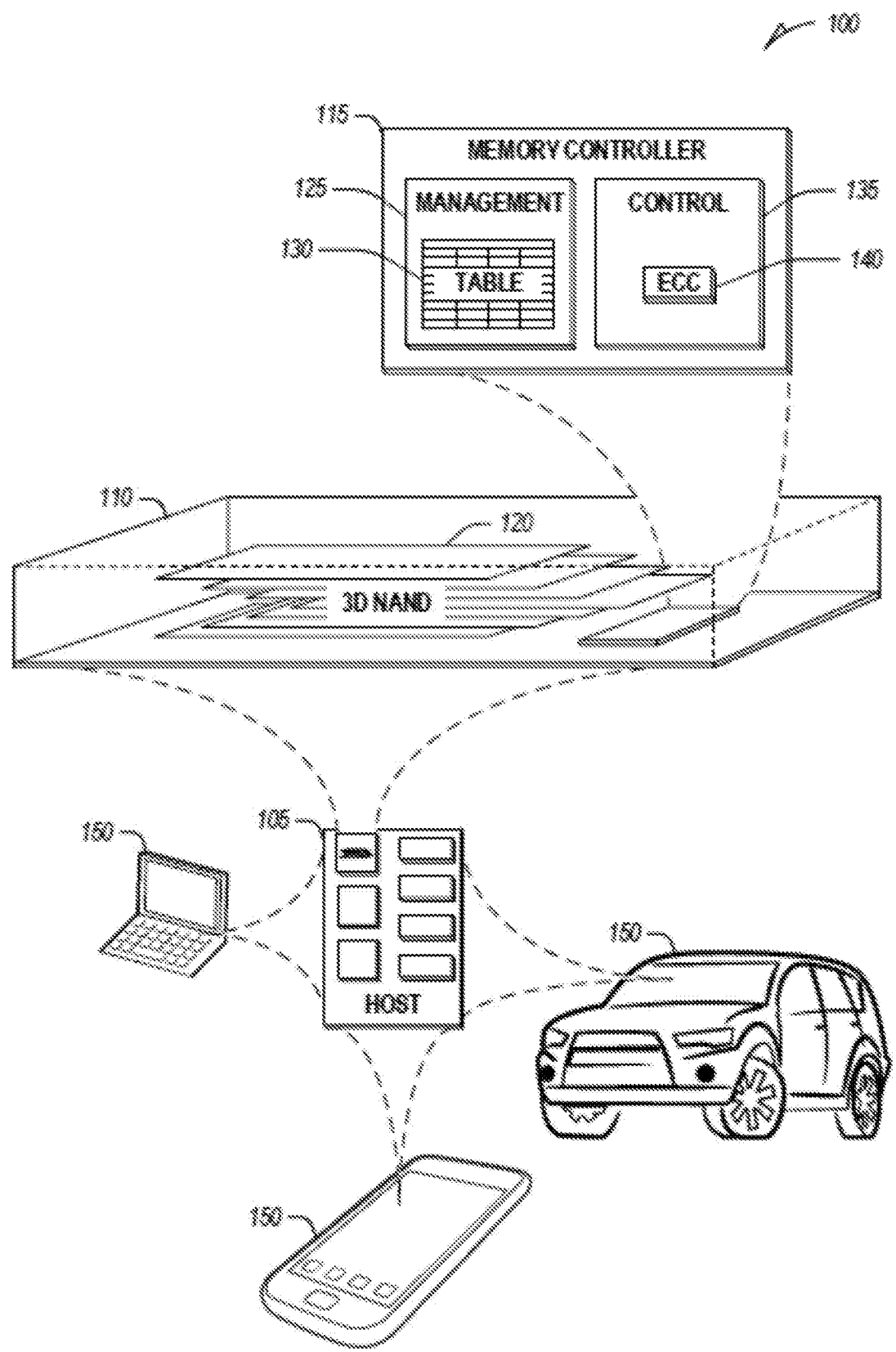
FIG. 1 illustrates an example of an environment including a memory device, according to some embodiments.

Embodiments of the disclosure relate generally to memory sub-systems and more specifically, to runtime allocation to avoid memory defects memory sub-systems so that defective or marginal physical erase blocks are not allocated until certain criteria are met.

One class of memory sub-system is a NAND flash memory SSD. Such SSDs are designed to serve as mass storage devices in data storage systems of all types. As a result, standard specifications for such devices allow a manufacturer to sell NAND flash devices having, at beginning or end of device life, a percentage of non-functional physical capacity due to defective or marginal media units. These defects cause "bad" or "marginal" blocks of memory. As described herein, the term "bad block" refers to both non-functional physical blocks as well as functional blocks with substandard performance characteristics or other problems (e.g. marginal blocks). Bad blocks can thus refer to defective and marginally functional blocks, as identified by a memory sub-system. Although NAND devices permit write addressing at a page level, read addressing at a logical block (LB A) level, and erasure addressing at a block level, there are some practical difficulties in such asymmetric address resolution. These difficulties can include addressing overhead for a variety of tasks and operations, including maintenance of flash translation layer (FTL) tables. To address these issues, blocks can be aggregated into a single logical entity to which data is written and erased. These aggregated groups of blocks are referred to as "erase block groups" or "erase groups". Some embodiments may also refer to such groupings of blocks as "superblocks" or using other such terminology. Examples of such erase groups include redundant array of independent NAND (RAIN) stripes, erasure coding groups, replication groups, or other such groupings of blocks.

Such erase groups can be structured to each include a block from every plane in every die of a NAND array in a memory subsystem. This arrangement can provide various benefits, such as parallel execution of a write command across die, and such as fault isolation between physical die or components or other circuitry. In some embodiments of memory sub-systems, different standard patterns of blocks from different die can automatically be selected by the memory management circuitry for a memory sub-system in order to distribute the blocks between erase groups in different ways optimally based on the structure and intent of the array of NAND. This can allow the bad blocks in a device to be distributed between the erase groups in different ways.

In order to manage erase groups with bad blocks, the bad blocks in an erase group can be dynamically "remapped" at any time such that a replacement block from a different portion of a die (e.g., outside the standard pattern for erase group allocation of blocks) is used as part of an erase group. In some memory devices, this remapping can cause performance degradation, where a time to erase data and write data to an erase group with a greater number of bad blocks is higher than a time to erase data and write data to an erase group with a fewer number of bad blocks (e.g., an erase group with more bad blocks can, in some systems, have slower erase and write performance). Similarly, marginal blocks can cause read time to increase, thus reducing memory performance. Therefore, in some embodiments, functional but marginal (e.g. blocks with lower performance characteristics but that still operate to store and provide access to data) can be grouped into erase block groups that can be excluded from use until a threshold is met.

Due to additional defects, marginalities, and bad blocks that occur over time in SSDs due to repeated write and erase cycles, (PECs) aging the memory cells, standard systems prioritize available erase block groups based on the number of erase cycles that an erase group has undergone. Increasing relative age of erase block groups is associated with a decreasing relative probability of allocation of the erase block group. Due to the potential for selection of erase groups having remapped bad blocks to reduce performance, selection of erase groups based strictly on a lower number of erase cycles can result in reduced performance. Embodiments described herein thus improve performance of some memory devices by using additional schemes to allocate erase block groups in some circumstances. In particular, under certain conditions, embodiments described herein select erase groups with a limited number of remapped bad blocks in order to improve device performance (e.g. speed, quality of service (QoS), latency, throughput, and other such performance metrics).

For example, in one embodiment, after erase groups for a memory device have been established, the memory device will initially respond to requests for memory use by allocating erase groups with less than a threshold number of bad blocks until a certain condition or set of conditions occurs. Such conditions can include running out of erase groups that meet the bad block threshold, a threshold imbalance in cell relative age (e.g., wear or a number of write/erase operations compared with a maximum number of allowed write/erase operations for blocks in a device), or other such conditions. After one or more of the trigger condition(s) occur, the device changes the criteria for allocating erase groups for use, and proceeds to allocate erase groups without consideration for the number of bad blocks in the available erase groups. Such an embodiment improves the speed of a device under initial operating conditions without reducing the amount of memory available during steady state operation of a device, and without affecting warranty lifetime or other external quality requirements. Additionally, by grouping marginal blocks as part of bad block erase groups, some embodiments can reduce a "trigger rate" for the whole system, where a "trigger rate" is a ratio of media error retries per unit total read work, including host and internal reads.

FIG. 1 illustrates an example of an environment 100 including a host device 105 and a memory device 110 configured to communicate over a communication interface. The host device 105 or the memory device 110 can be included in a variety of products 150, such as memory for data centers, Internet of Things (IoT) devices (e.g., a refrigerator or other appliance, sensor, motor or actuator, mobile communication device, automobile, drone, etc.), personal computers, or other such devices to support processing, communications, or control of the product 150.

The memory device 110 includes a memory controller 115 and a memory array 120 including, for example, a number of individual memory package (e.g., a stack of three-dimensional (3D) NAND die). In 3D architecture semiconductor memory technology, vertical structures are stacked, increasing the number of tiers, physical pages, and accordingly, the volumetric density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host device 105 can be a machine having some portion, or all, of the components discussed in reference to the computer system 800 of FIG. 8.

The memory controller 115 can receive instructions from the host device 105, and can communicate with the memory array 120, such as to transfer data to (e.g., write or erase) or from (e.g., read) one or more of the memory cells, planes, sub-blocks, blocks, or pages of the memory array 120. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host device 105 and the memory device 110.

The memory controller 115 can implement a flash translation layer (FTL) using erase groups. In other embodiments, RAIN can be implemented by subdividing erase blocks into "tiles", and grouping (e.g. "RAINing") those tiles together so a particular physical memory block belongs to multiple RAIN stripes. In general, a superblock or RAIN Stripe comprises a set of blocks in a predetermined position across various planes of a die, and across the die of the memory array 120. Thus, in an example, a superblock is all of the first blocks in all planes of each die, and in another example, all of the second blocks in all planes of each die. The blocks for a superblock have the same intra-die index across die. For example, if a superblock has block zero in die zero, it also has block zero in die one, in die two, and in die three, etc. Other erase groups can have a selected offset (e.g., diagonal) between the index values for blocks included in the erase group.

The memory manager 125 can include, among other things, circuitry or firmware, such as a number of components or integrated circuits associated with various memory management functions. For purposes of the present description, example memory operation and management functions will be described in the context of NAND memory. Persons skilled in the art will recognize that other forms of non-volatile memory can have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding erase block group age, erase block group erase counts, error history, or one or more error counts (e.g., a write operation error count, a read bit error count, a read operation error count, an erase error count, etc.) for one or more erase block groups of memory cells coupled to the memory controller 115. In some embodiments, the management table can track data for physical blocks within erase block groups, sets of erase block groups, sets of physical blocks independent of erase block grouping or RAIN stripe assignments, or in any other such organization and tracking. In certain examples, if the number of detected errors for one or more of the error counts is above a threshold, the bit error can be referred to as an uncorrectable bit error. The management tables 130 can maintain a count of correctable or uncorrectable bit errors, among other things. In an example, the management tables 130 can include translation tables or a logical to physical (L2P) mapping. Such management tables 130 can additionally include one or more bad block tables with raw data for bad blocks within a device, or a defect mapping table, which maps blocks with defects among the erase groups (and other groups within a device, such as redundant blocks, which can be present along with erase groups). As described above, in some embodiments, such a table can also include data for marginal blocks or other physical blocks that degrade performance when included in an erase block group.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host device 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between the host device 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

Figure 2:
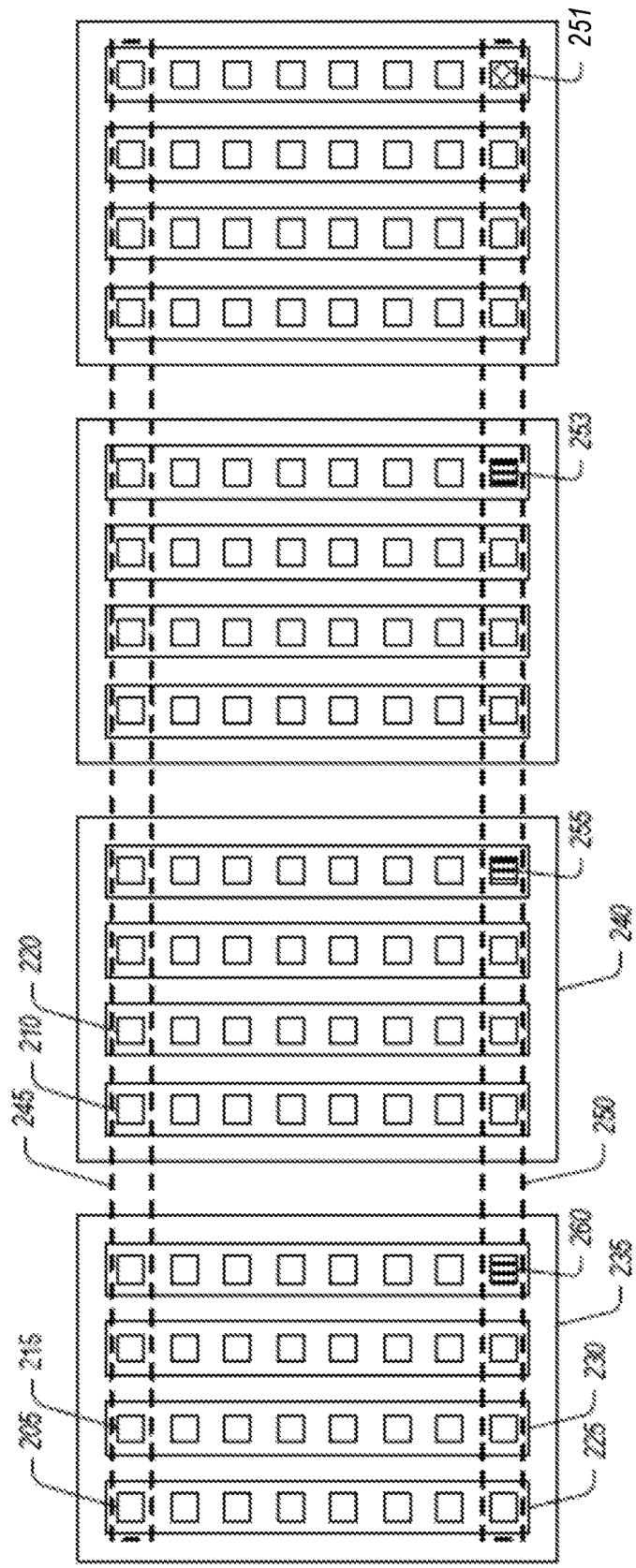
FIG. 2 illustrates an example of blocks organized into erase groups in accordance with some embodiments.

FIG. 2 illustrates an example of physical blocks organized into erase groups in accordance with some embodiments. The erase groups (e.g. superblocks) include the erase group 245 with no bad blocks and erase group 250 with multiple bad blocks. Erase group 245 spans all four planes of all four die, with a block in the same position (e.g., the first position) across the planes. For example, erase group 245 includes blocks 205, 210, 215, and 220, of planes 225 and 230, respectively, in die 235 and die 240. The erase group 250 differs from erase group 245 because it encompasses bad blocks 251, 253, 255, and 260. During operation, when erase group 250 is allocated, blocks 251, 253, 255, and 260 are remapped to other blocks in another area of the device in order to maintain the structure of the erase group.

Figure 3A:
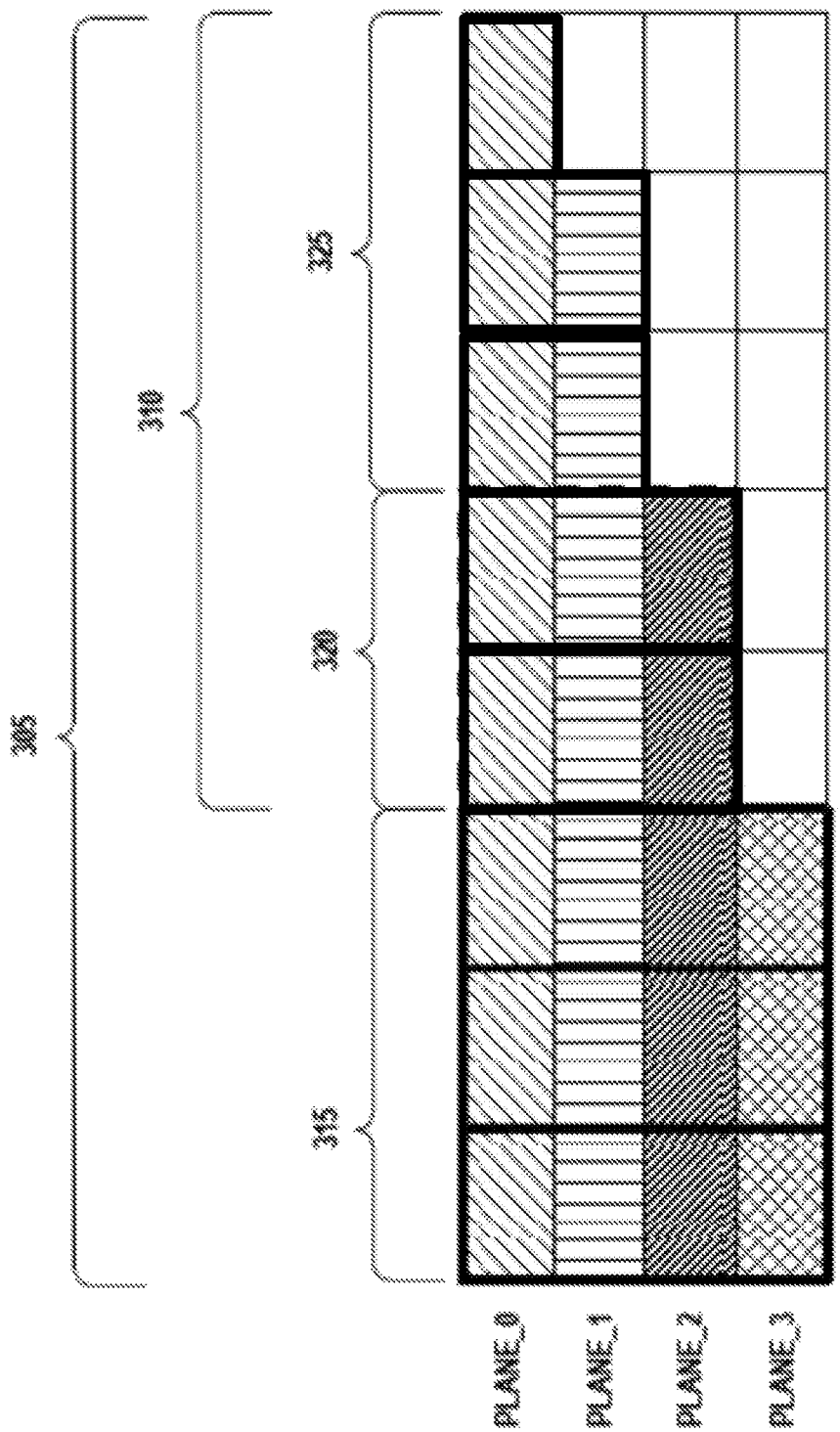

FIG. 3A illustrates additional aspects of blocks organized into erase groups in accordance with some embodiments. As illustrated in FIG. 3A, good blocks within a plane have the same shading while bad blocks are unshaded. In the example embodiment of FIG. 3A, the erase groups are structured by column, with eight total erase groups 305. Illustrated erase groups 315 include no bad blocks (e.g. non-functional or marginally functional blocks), the erase groups 320 include one bad block each, and the erase groups 325 include two or more bad blocks. Other organizations of blocks into erase groups can be used. For example, an offset from 0-8 can be assigned, so that a block from each plane can be placed in an erase group with a block from the plane below that is diagonally shifted by a number of blocks determined by the offset value.

This can result in a different distribution of bad blocks among the erase groups. For example, the illustrated erase groups with an offset of zero (e.g., blocks are in erase groups by column) results in five erase groups 310 with each erase group of erase groups 310 having one or more bad blocks. An offset of 1, where a block in plane_0 is in an erase group with the block one space down and one space to the right, and the corresponding blocks plane_1 and plane_2 similarly being in an erase group with a block one space down and one space to the right, would result in seven erase groups having one or more bad blocks, and only one erase group having no bad blocks. This can be compared with the offset zero illustrated in FIG. 3A, with four erase groups 315 having no bad blocks, and five erase groups 310 having one or more bad blocks.

Figure 3B:
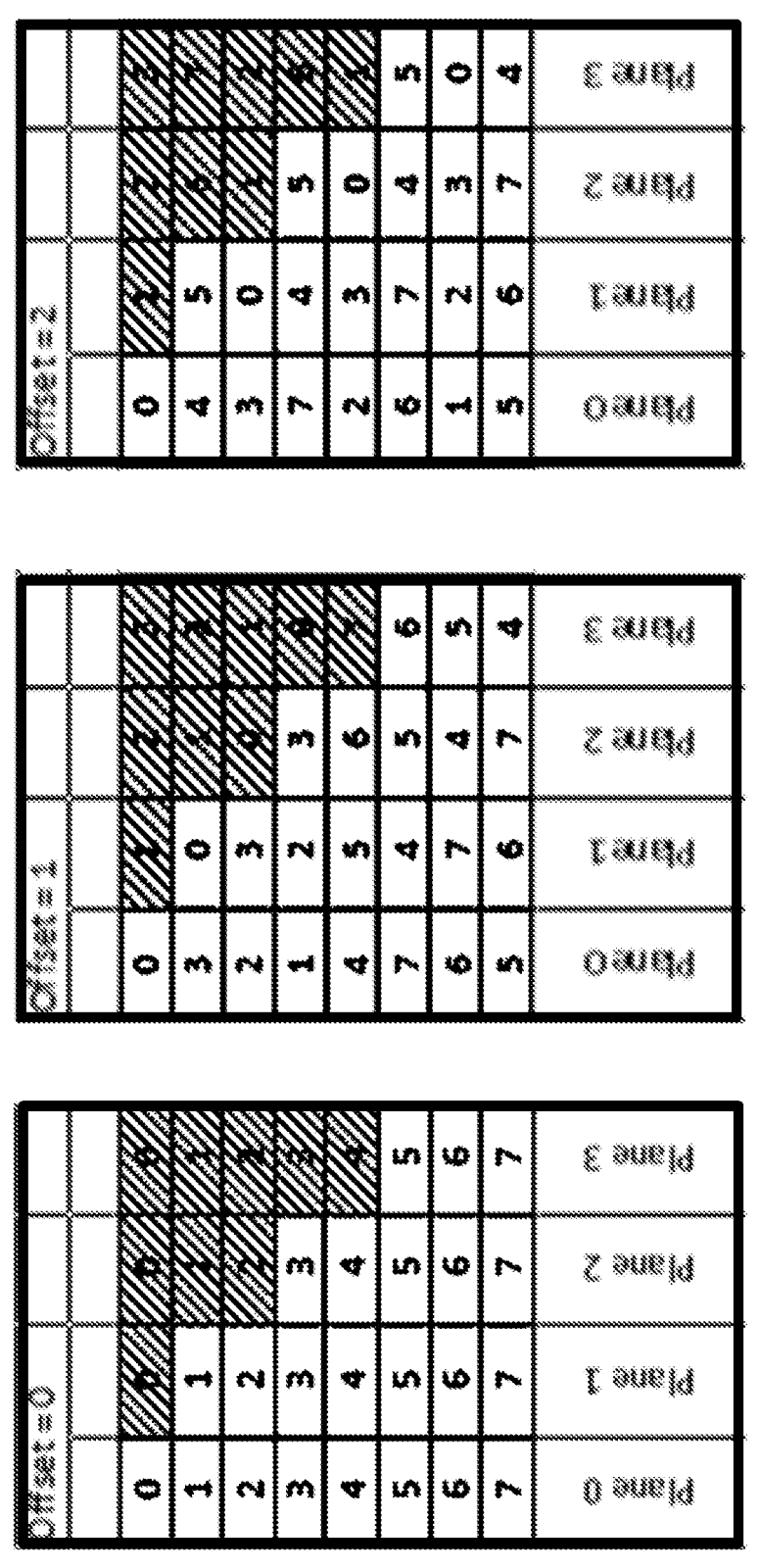

FIG. 3B illustrates three different erase block groupings with three different offsets for physical blocks in four planes labeled as planes 0-3, physical blocks in the same erase block group having the same number, and eight erase block groups labeled with the physical blocks for each group assigned an associated number from zero to seven. The bad or marginal physical blocks are shaded. For offset zero, the physical blocks in each row are grouped into into the same erase block group. For offsets of one and two, different patterns exist. For example, for offset one, the first physical block of plane 0, the second physical block of plate 1, the third physical block of plane 2, and the fourth physical block of plane 3 are grouped into erase block group 0. For offset two, the third physical block of plane 0, the fifth physical block of plane 1, the seventh physical block of plane 2, and the first physical block of plane 3 are grouped into erase block group 3. While not shown, additional offsets are possible with different groupings of the physical blocks. As described herein, various embodiments can group the bad or marginal physical blocks into erase block groups to improve performance of the system by having certain erase block groups that are not used until certain criteria are met.

Once the blocks are all structured into erase groups, initial operation of a memory sub-system including erase groups 305 involves allocating erase groups for use based on a first set of criteria that includes consideration of the number of bad blocks in each erase group. For example, if the first set of criteria is that groups with no bad blocks are allocated with priority over erase groups with bad blocks, then if any erase group of erase groups 315 is available when an allocation is to be made, then that erase group is allocated instead of an erase group from erase groups 310. If more than one erase group from erase groups 315 is available for allocation, then additional information about each available erase group, such as the number of erase operations performed on each erase group, can be considered as part of the first set of criteria. As the memory sub-system operates under this first set of criteria, various conditions of the memory sub-system can be monitored, such as a threshold difference in a number of erase operations between an erase group of erase groups 315 having the most erase operations and an erase group of erase groups 310 having the least number of erase operations. Once the threshold difference occurs, the memory sub-system transitions to using a second set of criteria that does not consider the number of bad blocks in an erase group.

In various embodiments, different allocation criteria and conditions for transitions between criteria can be used. For example, instead of preferential allocation for erase groups having no bad blocks, the first set of criteria can instead involve that erase groups with fewer than two bad blocks are given priority. In such an embodiment, erase groups 315 and 320 are considered together, and erase groups 325 are not allocated unless no other erase group of erase groups 315 or 320 are available. In some embodiments, multiple tiers of priority based on the number of bad blocks in an erase group can be used, such that in the example of FIG. 3A, erase groups 315 have priority over erase groups 320 and 325, and erase group 320 has priority over erase group 325 during an initial first set of allocation criteria. In some embodiments, the organization of blocks into erase groups (e.g., using various diagonal offsets as described above) can be selected to distribute bad blocks across erase groups in a preferred fashion. For example, the erase groups can be structured to prioritize creation of a number of erase groups with fewer than two bad blocks. Other embodiments can be structured to distribute bad blocks between erase groups in any such fashion to create distributions of erase groups with preferred characteristics for an initial set of allocation criteria to improve performance before a transition condition occurs.

Figure 4:
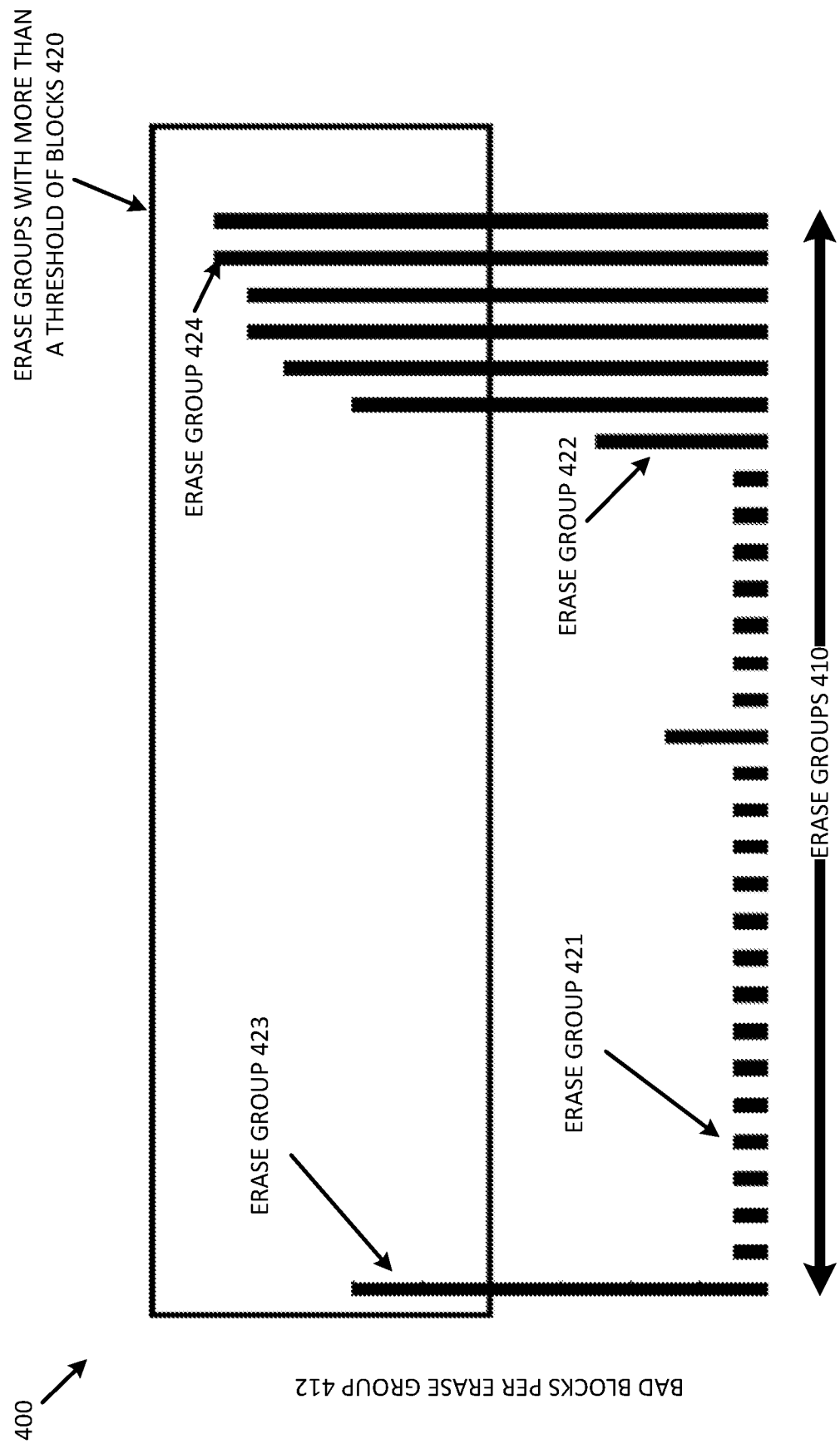
FIG. 4 illustrates aspects of a distribution of bad blocks into erase groups in accordance with some embodiments described herein.
Figure 5:
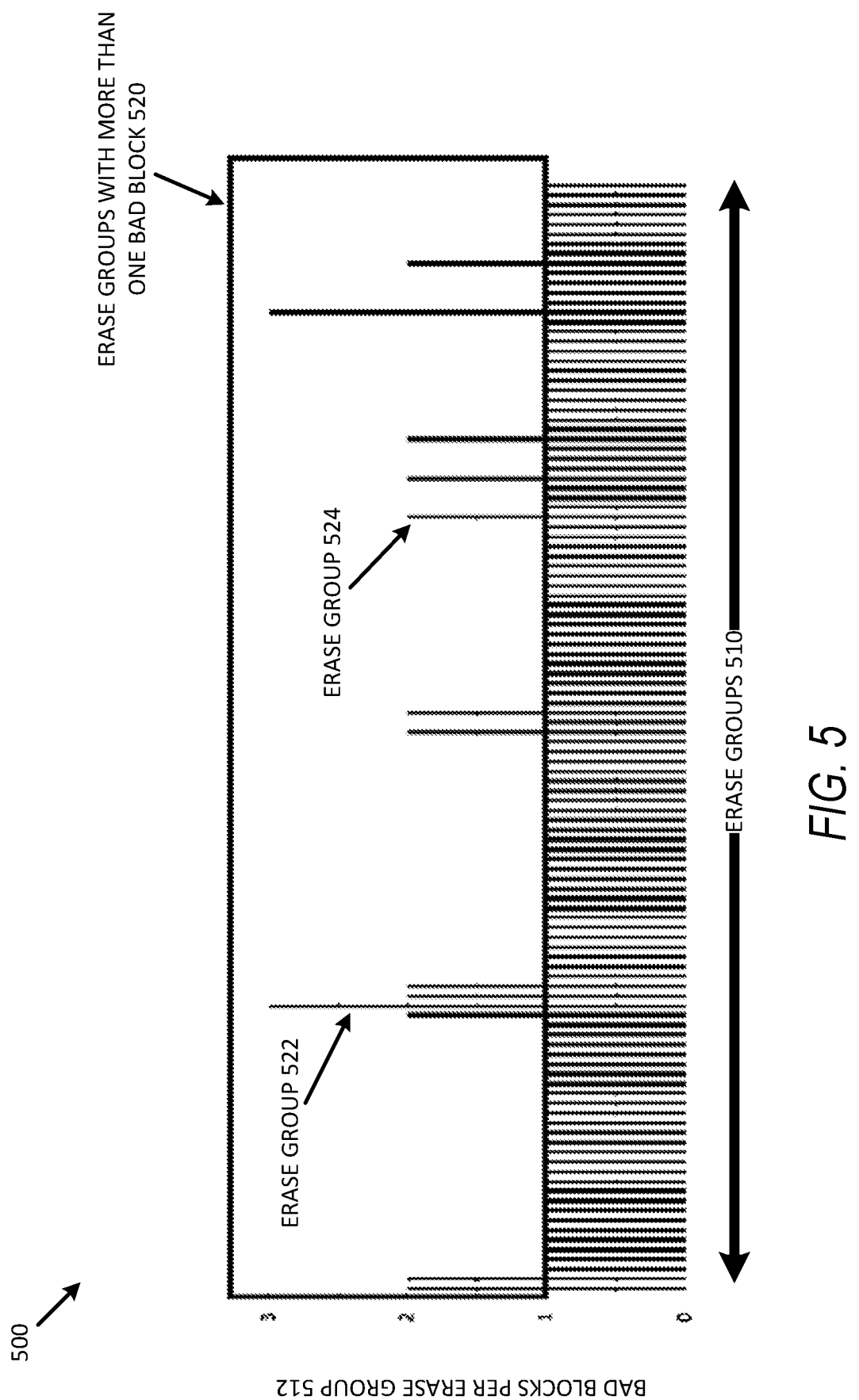
FIG. 5 illustrates aspects of a distribution of bad blocks into erase groups in accordance with some embodiments described herein.
Figure 6:
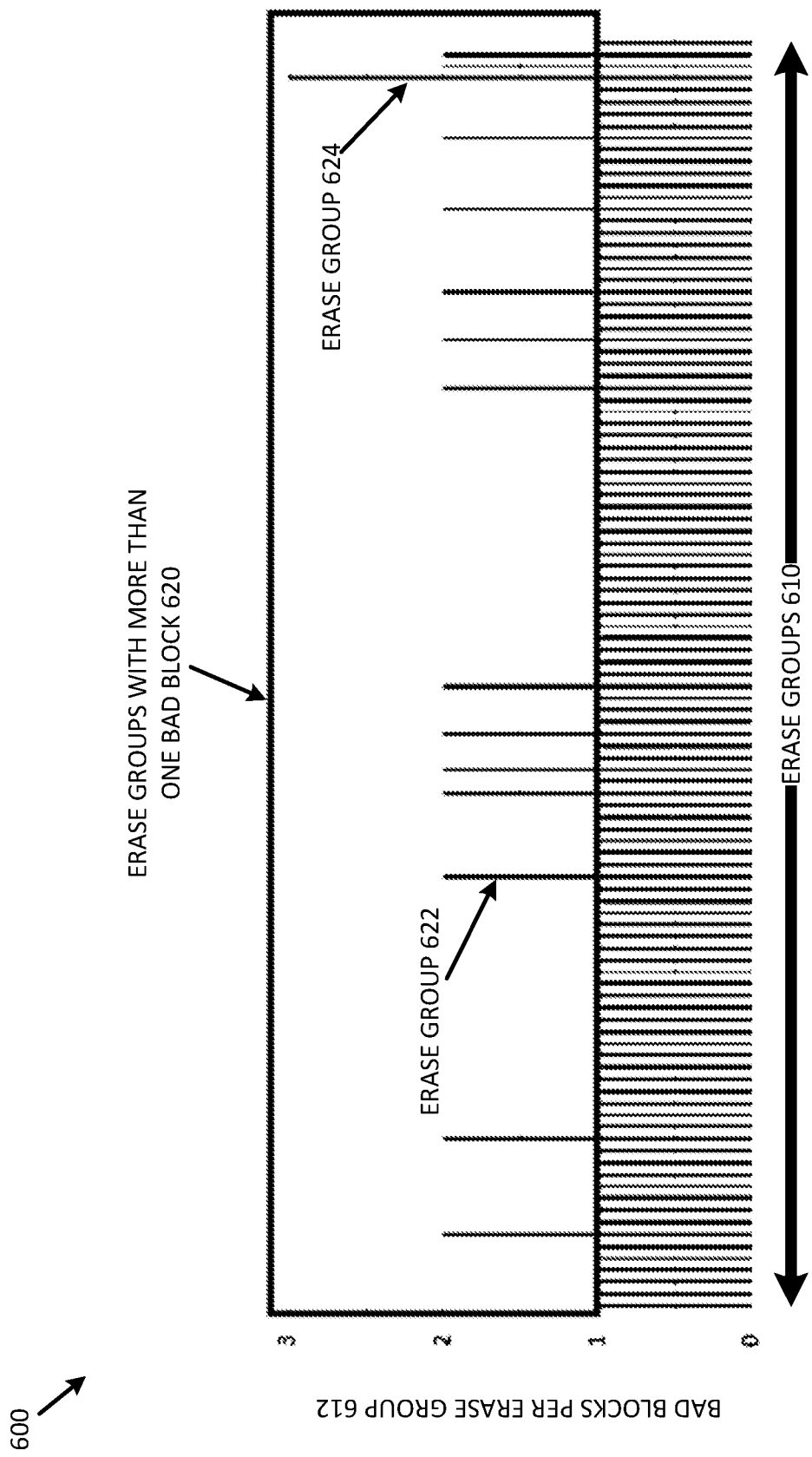
FIG. 6 illustrates aspects of a distribution of bad blocks into erase groups in accordance with some embodiments described herein.

FIGS. 4-6 illustrate aspects of distributions of bad blocks into erase groups in accordance with some embodiments described herein. The charts 400, 500, and 600 of respective FIGS. 4-6 each illustrates various distributions of blocks into erase groups with the number of bad blocks for each erase group charted. As described above, an SSD can include a number of memory devices, including a number of dies or logical units (e.g., logical unit numbers or LUNs), and can include one or more processors or other controllers performing logic functions required to operate the memory devices or interface with external systems. Such SSDs may include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations, to transfer data (e.g., user data and associated integrity data, such as error data and address data, etc.) between the memory devices and the host, or erase operations to erase data from the memory devices.

An SSD has the potential for failure and data loss. A method for protecting data in an SSD has included adding levels of error correction code (ECC) to pages and then recovering data using the ECC. A protection scheme beyond ECC has included utilizing approaches at the device level with the use of multiple memory devices, providing a redundant array of independent NAND (RAIN) protection. Versions of SSD data protection technology in these approaches have varied. In some embodiments as described above, for example, RAIN can be implemented by subdividing erase blocks into "tiles", and grouping (e.g. "RAINing") those tiles together so a particular physical memory block belongs to multiple RAIN stripes.

Some SSD controllers use parallelism in order to increase SSD performance and locate stored data across a set of flash devices, which may be realized as many relatively smaller flash devices to attain a large capacity associated with other storage devices. This parallelism in SSDs spreads across multiple of the flash devices of the set. This can be referred to as striped data without parity. RAIN technology adds user data protection that extends beyond ECC, minimally impacts drive performance, and can perform NAND management for improved device operation. With a high degree of parallelism already in place within the SSD by striping, adding a parity protection architecture adds another layer of protection.

RAIN is an umbrella term for data storage schemes that divide and/or replicate data among multiple pages of multiple memory devices, for instance, in order to help protect the data stored in the memory devices. The multiple memory devices in a RAIN array may appear to a user and an operating system of a computing machine as a single memory device. RAIN can include striping (e.g., splitting) data so that different portions of the data are stored on different pages of different memory devices. The portions of the different memory devices that store the split data are collectively referred to as a stripe. In an architecture for a particular RAIN design, a number of the pages of memory cells in a memory array can store a parity portion of a RAIN stripe. For instance, each respective one of the number of pages can include a parity portion of a different RAIN stripe. Since a RAIN stripe can be a combination of user data, other data, and parity data, the parity data can reduce the capacity of the SSD to store user data and can affect the performance of the SSD. RAIN can also include mirroring, which can include storing duplicate copies of data on more than one page of more than one device.

As described above, an erase group as described herein can be a RAIN stripe for a memory sub-system. Additionally, in various embodiments, rather than every block being assigned to an erase group, some blocks are kept as "redundant blocks" in order to operate as substitutes for bad blocks within an erase group. Thus, for example, in FIG. 3A, rather than the blocks of the column identified as erase groups 325 being assigned to active erase groups, these blocks can be identified as "redundant blocks". One embodiment, for example, can have 4 planes, with 204 main blocks and 14 redundant blocks per plane. Just as described above for different patterns of assigning blocks to erase groups, the patterns of such assignments impact the number of bad blocks assigned as redundant blocks. In a system using RAIN striping, diagonal mapping can be used to distribute bad blocks into groups of redundant blocks. This, however, is still likely to result in RAIN stripes (e.g., erase groups) with multiple bad blocks.

FIGS. 4-6 illustrate erase groups for an example device with a different offset used to allocate the blocks differently between RAIN stripe erase groups. In the embodiments of FIGS. 4-6, each erase group is assigned 16 blocks. All erase groups for the associated block allocations are not included in the associated charts; only the erase groups with at least one bad block (e.g., a block with a defect) are included. As can be seen, in some embodiments, including the embodiments of FIGS. 4-6, certain erase groups are mapped to at least one bad block associated with a firmware image slot and a telemetry slot. Additionally, due to the distribution of defects, at least some erase groups for each diagonal RAIN stripe are associated with two or more bad blocks.

Chart 400 of FIG. 4 shows erase groups 410 with at least one bad block charted against the bad blocks per erase group 412. Erase group 421 and erase group 422 each has one bad block, erase group 423 has 12 bad blocks, and erase group 424 has 16 bad blocks (e.g., every block of erase group 424 is a bad block). The set of erase groups shown as erase groups 420 are erase groups where more than 40% of the blocks are bad blocks. Certain manufacturing processes can, for example, result in certain block groupings concentrating the defects into a small number of erase groups as illustrated in FIG. 4 by erase groups 420. Use of these erase groups can slow performance, and so managing use of these groups under certain circumstances can improve device performance without compromising other device characteristics by making these erase blocks available during other circumstances.

Chart 500 of FIG. 5 and chart 600 of FIG. 6 show different allocations of blocks into erase groups that result in a larger number of erase groups with at least one bad block, but no erase groups with more than three bad blocks. Chart 500 shows erase groups 510 charted with a number of bad blocks per erase group 512, resulting in 13 erase groups with more than one bad block 520. This includes, for example, erase group 522 with three bad blocks, and erase group 524 with two bad blocks. Similarly, chart 600 shows erase groups 610 charted against a number of bad blocks per erase group 612 with 15 erase groups with more than one bad block 620, including erase group 622 with two bad blocks and erase group 624 with three bad blocks. A particular assignment of blocks to erase groups can thus be made to achieve a target bad block distribution among the erase groups.

Depending on the particular performance criteria of a design or device, different distributions of bad blocks among the erase groups and the redundant blocks can be preferable, and a system can select the appropriate distribution based on the design criteria and/or the actual impact of a particular distribution on the specific defects present in a device (and the resulting bad blocks). Such operations can be managed using a defect mapping table for each erase group, such as management tables 130 described above. In some embodiments, management tables 130 can include an allocation table identifying which erase groups are to be used for a next memory request. Such tables can include a first table structured according to a first set of allocation criteria that gives allocation priority to erase groups with no bad blocks, and a second table structured according to a second set of allocation criteria that does not include any priority based on the bad blocks within an erase group. A device can then switch from the first table to the second table when a tracked condition or threshold is met. Other embodiments can use any number of tables with differing criteria and associated conditions for when a specific allocation table is used.

Figure 7:
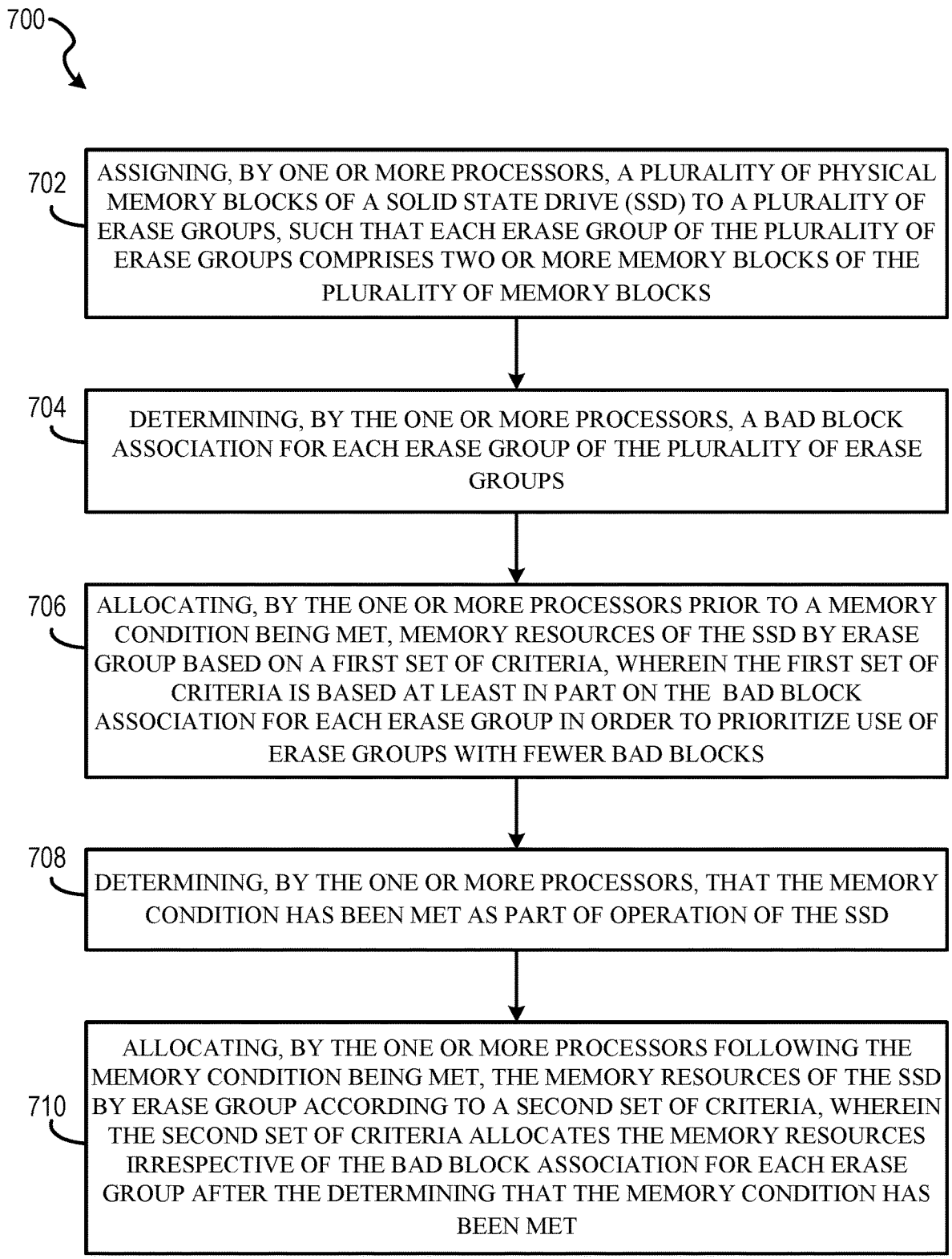
FIG. 7 is a flowchart of a method for runtime allocation to avoid memory defects in accordance with some embodiments.

FIG. 7 is a flowchart of a method 700 for runtime allocation to avoid memory defects in accordance with some embodiments. In some embodiments, the method 700 is performed by a memory sub-system using a memory controller of the memory subsystem (e.g., the memory sub-system 910 of FIG. 9). In some embodiments, the method 700 is performed by a host device or system such as host system 920 or host device 105. In some embodiments, the method 700 is embodied by instructions in a storage medium that, when executed by one or more processors, causes a device to perform the method 700.

Method 700 begins with operation 702 involving assigning, by one or more processors, a plurality of memory blocks of a solid state drive (SSD) to a plurality of erase groups, such that each erase group of the plurality of erase groups comprises two or more memory blocks of the plurality of memory blocks. Then operation 704 involves determining, by the one or more processors, a bad block association for each erase group of the plurality of erase groups. This determination can involve generating or accessing a table identifying which erase groups have more than a threshold number (e.g., zero, one, two, etc.) of erase blocks as part of the standard block assignment (e.g., prior to substitution of new blocks from other areas for the bad blocks). This determination can involve read/write/erase operations performed to identify blocks with defects that prevent the block from operating correctly. In some embodiments, one or more initial operations are performed to identify defects and associated bad blocks prior to operations 702 and 704, and the erase groups are configured in operation 702 based on the identified defects and associated bad blocks. The subsequent operations 704 then involve identifying erase groups with bad blocks, or erase groups with a threshold number of bad blocks.

The determination of bad block associations with erase groups is then used as part of a first set of criteria in operation 706 in allocating, by the one or more processors prior to a memory condition being met, memory resources of the SSD. In a simple version of such operations, the device allocates an erase group with no bad blocks in response to a memory write request by a host, unless there are no erase groups without bad blocks available. If no such erase groups are available, an erase group with bad blocks can be allocated. In other embodiments, more complex sets of priorities can be used other than a simple priority for erase groups with no bad blocks.

As the memory operates in an initial condition (e.g., a fresh out of box (FOB) condition) using the first set of criteria, which operates under a preference for erase groups with fewer (e.g., zero) bad blocks, the system tracks various memory condition metrics, and determines, in operation 708, that a particular condition has been met. Such metrics can be associated with preventing unrecoverable wear leveling problems or conditions where prioritizing erase groups with no bad blocks will no longer provide performance (e.g., speed) benefits.

In one embodiment, the memory condition is associated with a memory device being fully saturated, such that all available erase groups are used for data storage. Under such a condition, where all available erase groups are storing data (e.g. the memory sub-system is "fully saturated"), the memory condition is met, and the criteria used for allocation of memory resources shifts from a first criteria to a second criteria.

Another such example memory condition involves imbalanced wear conditions as different erase groups are subject to different numbers of wear operations (e.g., write/erase operations). Memory in SSD devices degrades over time so that memory blocks are more likely to fail with greater numbers of write/erase actions. In order to limit the possibility of device failure from such wear, "wear leveling" is used to keep the different media elements of a SSD in similar condition. While a certain amount of imbalance can occur due to random aspects of memory storage, wear leveling can be configured to prevent certain imbalances. Prioritizing erase groups with fewer bad blocks can create such imbalances in wear leveling, and these imbalances can be tracked as memory conditions. For example, if one erase group is subject to a threshold number of erase/write operations more than another erase group, this can trigger a change to a steady state condition with different memory allocation criteria. Similarly, if the difference in expected lifetime erase cycles remaining for different erase groups exceeds a threshold (e.g., ten percent, twelve percent, etc., depending on the system), this can trigger a memory condition change in accordance with operation 708. By tracking such variations in wear leveling, and transitioning to different allocation criteria, embodiments can provide performance improvements (e.g., faster memory operations) while avoiding reductions in operational lifetime, end of life performance, or available physical memory.

Some embodiments can simply track the availability of erase groups with no bad blocks, and transition to the new set of criteria as soon as the erase groups with no bad blocks are all in use. Other embodiments can track when all erase groups have been used. Still further embodiments can track thresholds associated with an amount of time a device has been powered on, a number of power cycles, a total amount of data (e.g., in megabytes or gigabytes) that has been written to a SSD, or a total amount of time since a device was provisioned for use. Data for any such conditions can be tracked and used to transition to a new set of allocation criteria in various embodiments of operation 708. Then, after the determination has been made that the memory condition has been met as part of operation of the SSD in operation 708, the device subsequently proceeds in operation 710 with allocating, by the one or more processors following the memory condition being met, the memory resources of the SSD by erase group according to a second set of criteria. This second set of criteria allocates the memory resources irrespective of the number of bad blocks for each erase group after the determining that the memory condition has been met. While this second set of criteria does not provide the speed benefits of the first set of criteria with a preference for erase groups with no or fewer bad blocks, the second set of criteria enables the benefits of balanced wear leveling and use of the entire available device memory over the targeted lifetime operation of the SSD after a transition from a FOB state (e.g., involving operation 706) to a steady state (e.g., operation 710).

The following are a non-exhaustive set of example embodiments of methods, devices, and systems, in accordance with the teachings herein.

Example 1 is a method for allocating memory resources comprising: assigning, by one or more processors, a plurality of memory blocks of a solid state drive (SSD) to a plurality of erase groups, such that each erase group of the plurality of erase groups comprises two or more memory blocks of the plurality of memory blocks; calculating, by the one or more processors, a number of bad blocks for each erase group of the plurality of erase groups; allocating, by the one or more processors prior to a memory condition being met, memory resources of the SSD by erase group based on a first set of criteria, wherein the first set of criteria comprises comparing the number of bad blocks for each erase group to prioritize use of erase groups with fewer bad blocks; determining, by the one or more processors, that the memory condition has been met as part of operation of the SSD; and allocating, by the one or more processors following the memory condition being met, the memory resources of the SSD by erase group according to a second set of criteria, wherein the second set of criteria allocates the memory resources irrespective of the number of bad blocks for each erase group after the determining that the memory condition has been met.

In Example 2, the subject matter of Example 1 optionally includes wherein each erase group comprises a redundant array of independent NAND (RAIN) stripe.

In Example 3, the subject matter of any one or more of Examples 1-2 optionally includes further comprising: identifying, using the one or more processors, the bad blocks of the plurality of memory blocks in the SSD prior to assigning the plurality of memory blocks to the plurality of erase groups, wherein the plurality of memory blocks are assigned to the plurality of erase groups to achieve a target bad block distribution among the plurality of erase groups.

In Example 4, the subject matter of any one or more of Examples 1-3 optionally includes, wherein the first set of criteria comprises allocating a first available erase group with no bad blocks and a first write/erase count over a second available erase group with at least one bad block and a second write/erase count that is smaller than the first write/erase count.

In Example 5, the subject matter of any one or more of Examples 1-4 optionally includes, wherein the memory condition comprises a determination that no erase groups without bad blocks are available for allocation.

In Example 6, the subject matter of any one or more of Examples 1-5 optionally includes, wherein the memory condition comprises a determination that the SSD has been fully saturated with all available erase groups used for data storage.

In Example 7, the subject matter of any one or more of Examples 1-6 optionally includes, wherein the memory condition comprises a determination that a wear leveling threshold has been exceeded whereby a first erase group with priority allocation under the first set of criteria has more than a threshold number of write/erase actions and more write/erase actions than a second erase group without priority allocation under the first set of criteria.

In Example 8, the subject matter of Example 7 optionally includes, wherein the memory condition further comprises one or more of: a threshold number of power cycles; a threshold power-on time; a threshold amount of data written to the SSD; and a time since initial use.

In Example 9, the subject matter of any one or more of Examples 1-8 optionally includes wherein the first set of criteria is associated with a fresh out of box (FOB) condition for the SSD.

In Example 10, the subject matter of Example 10 optionally includes wherein the second set of criteria is associated with a steady state (SS) condition for the SSD.

In Example 11, the subject matter of any one or more of Examples 1-10 optionally includes, wherein each memory block of the plurality of memory blocks is associated with approximately 83 megabytes (MB) of data, and wherein each erase group comprises 16 memory blocks.

In Example 12, the subject matter of any one or more of Examples 1-11 optionally includes, wherein each erase group comprises an erasure coding group.

In Example 13, the subject matter of any one or more of Examples 1-12 optionally includes, wherein the one or more processors comprise processing circuitry of a memory controller coupled to a plurality of memory components in a memory sub-system, wherein each memory component comprises a NAND die.

Example 14 is a device for runtime memory allocation to avoid memory defects, the device comprising: a controller communicatively coupled to a NAND memory array and configured to: manage storage of bad block identifiers, wherein the bad block identifiers identify one or more blocks of a plurality of memory blocks having defects rendering the one or more blocks unusable for memory storage; manage arrangement of the plurality of memory blocks into a plurality of erase groups, wherein each erase group of the plurality of erase groups comprises two or more memory blocks of the plurality of memory blocks; calculate a number of bad blocks for each erase group of the plurality of erase groups; allocate, prior to a first memory condition occurring, a first erase group for erasure based on a first set of criteria comprising the number of bad blocks for each erase group; determine that a first memory condition has been met after the first erase group is allocated for erasure; and allocate a second erase group for erasure based on a second set of criteria different from the first set of criteria after the first memory condition has been met.

In Example 15, the subject matter of Example 14 optionally includes, wherein the controller comprises processing circuitry of a host device coupled to a disaggregated physical storage device comprising the NAND memory array.

In Example 16, the subject matter of any one or more of Examples 14-15 optionally includes, wherein the controller comprises a memory controller of a memory sub-system, and wherein the memory sub-system comprises the NAND memory array coupled to the memory controller.

In Example 17, the subject matter of any one or more of Examples 14-16 optionally includes, wherein the controller is further configured to identify the bad blocks of the plurality of memory blocks in the SSD prior to assigning the plurality of memory blocks to the plurality of erase groups, wherein the plurality of memory blocks are assigned to the plurality of erase groups to achieve a target bad block distribution among the plurality of erase groups.

In Example 18, the subject matter of any one or more of Examples 14-17 optionally includes, wherein the first memory condition comprises one or more of: no erase blocks with no bad blocks being available for allocation; all available erase groups being used for data storage; and a threshold associated with avoiding an unrecoverable wear leveling condition.

Example 19 is a non-transitory computer-readable medium comprising instructions that, when executed by one or more processors of a device, cause the device to perform operations comprising: assigning a plurality of memory blocks of a solid state drive (SSD) to a plurality of erase groups, such that each erase group of the plurality of erase groups comprises two or more memory blocks of the plurality of memory blocks; calculating a number of bad blocks for each erase group of the plurality of erase groups; allocating, prior to a memory condition being met, memory resources of the SSD by erase group based on a first set of criteria, wherein the first set of criteria comprises comparing the number of bad blocks for each erase group to prioritize use of erase groups with fewer bad blocks; determining that the memory condition has been met as part of operation of the SSD; and allocating, following the memory condition being met, the memory resources of the SSD by erase group according to a second set of criteria, wherein the second set of criteria allocates the memory resources irrespective of the number of bad blocks for each erase group after the determining that the memory condition has been met.

In Example 20, the subject matter of Example 19 optionally includes, wherein the first set of criteria comprises allocating a first available erase group with no bad blocks and a first write/erase count over a second available erase group with at least one bad block and a second write/erase count that is smaller than the first write/erase count; and wherein the memory condition comprises one or more of: a determination that no erase groups without bad blocks are available for allocation, a determination that the SSD has been fully saturated with all available erase groups used for data storage, or a determination that a wear leveling threshold has been exceeded whereby a first erase group with priority allocation under the first set of criteria has more than a threshold number of write/erase actions and more than a second erase group without priority allocation under the first set of criteria.

Figure 8:
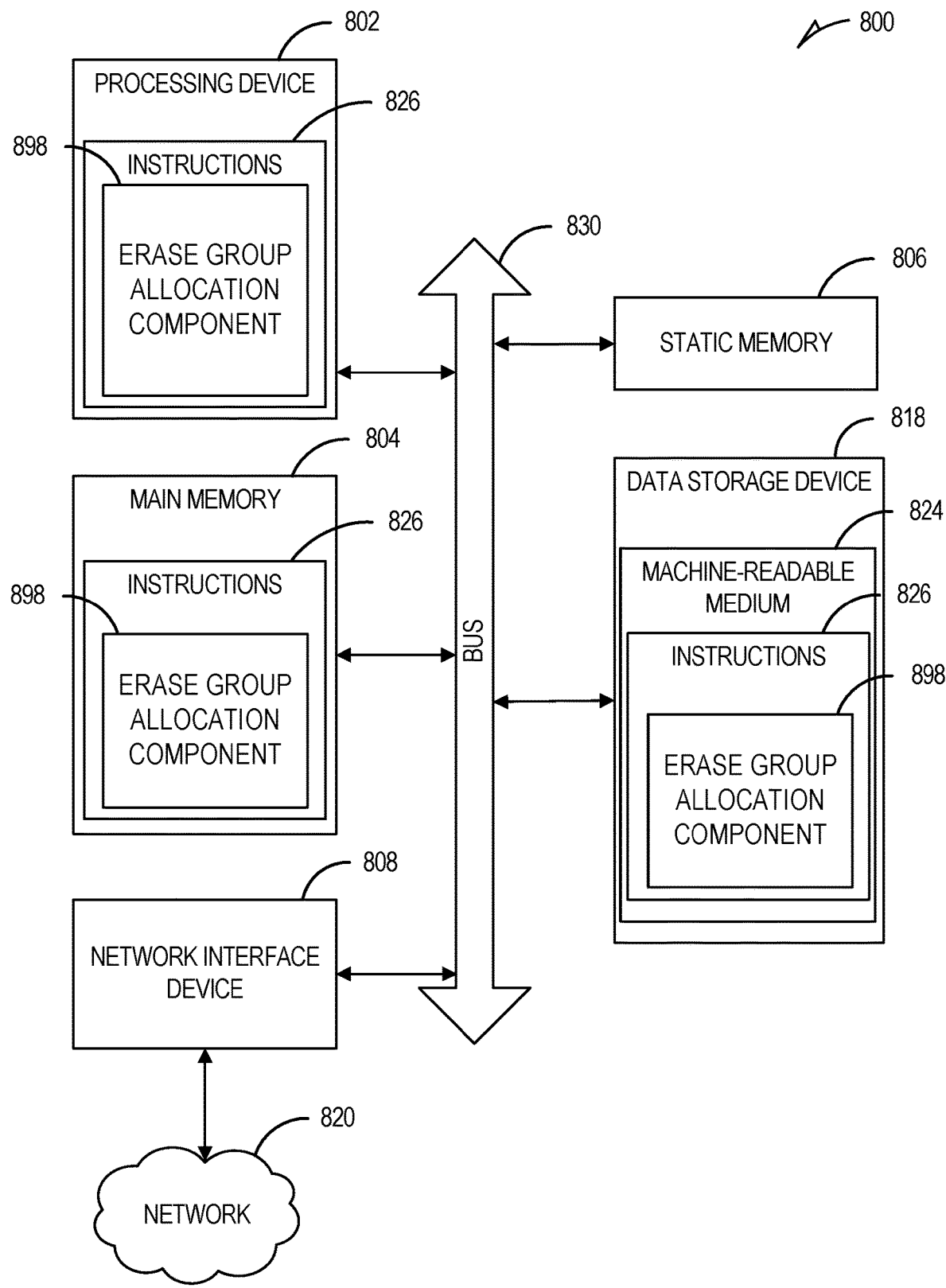
FIG. 8 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 8 illustrates an example machine of a computer system 800 within which a set of instructions can be executed for causing the machine to perform any one or more of the methodologies discussed herein. In some embodiments, the computer system 800 can correspond to a host system (e.g., the host device 105 of FIG. 1 or host system 920 of FIG. 9) that includes, is coupled to, or utilizes a memory sub-system or can be used to perform the operations of a controller. In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., ROM, flash memory, DRAM such as SDRAM or registered DRAM (RDRAM), etc.), a static memory 806 (e.g., flash memory, static random access memory (SRAM), etc.), and a data storage device 818, which communicate with each other via a bus 830.

The processing device 802 represents one or more general-purpose processing devices such as a microprocessor, a central processing unit, or the like. More particularly, the processing device 802 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an ASIC, a FPGA, a digital signal processor (DSP), network processor, or the like. The processing device 802 is configured to execute instructions 826 for performing the operations and steps discussed herein. The computer system 800 can further include a network interface device 808 to communicate over a network 820.

The data storage system 818 can include a machine-readable storage medium 824 (also known as a computer-readable medium) on which is stored one or more sets of instructions 826 or software embodying any one or more of the methodologies or functions described herein. The instructions 826 can include an erase group allocation component 898. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 910 of FIG. 9. In some embodiments, erase group allocation component 898 operates as part of a flash translation layer of a NAND device as described herein. In other embodiments, erase group allocation component 898 operates as control software of a host system interacting with memory (e.g., a NAND array) as part of a disaggregated memory architecture for the host system to manage memory allocation.

In one embodiment, the instructions 826 include instructions to implement functionality corresponding to the erase group allocation component 898. While the machine-readable storage medium 824 is shown in an example embodiment to be a single medium, the term "machine-readable storage medium" should be taken to include a single medium or multiple media that store the one or more sets of instructions 826. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Figure 9:
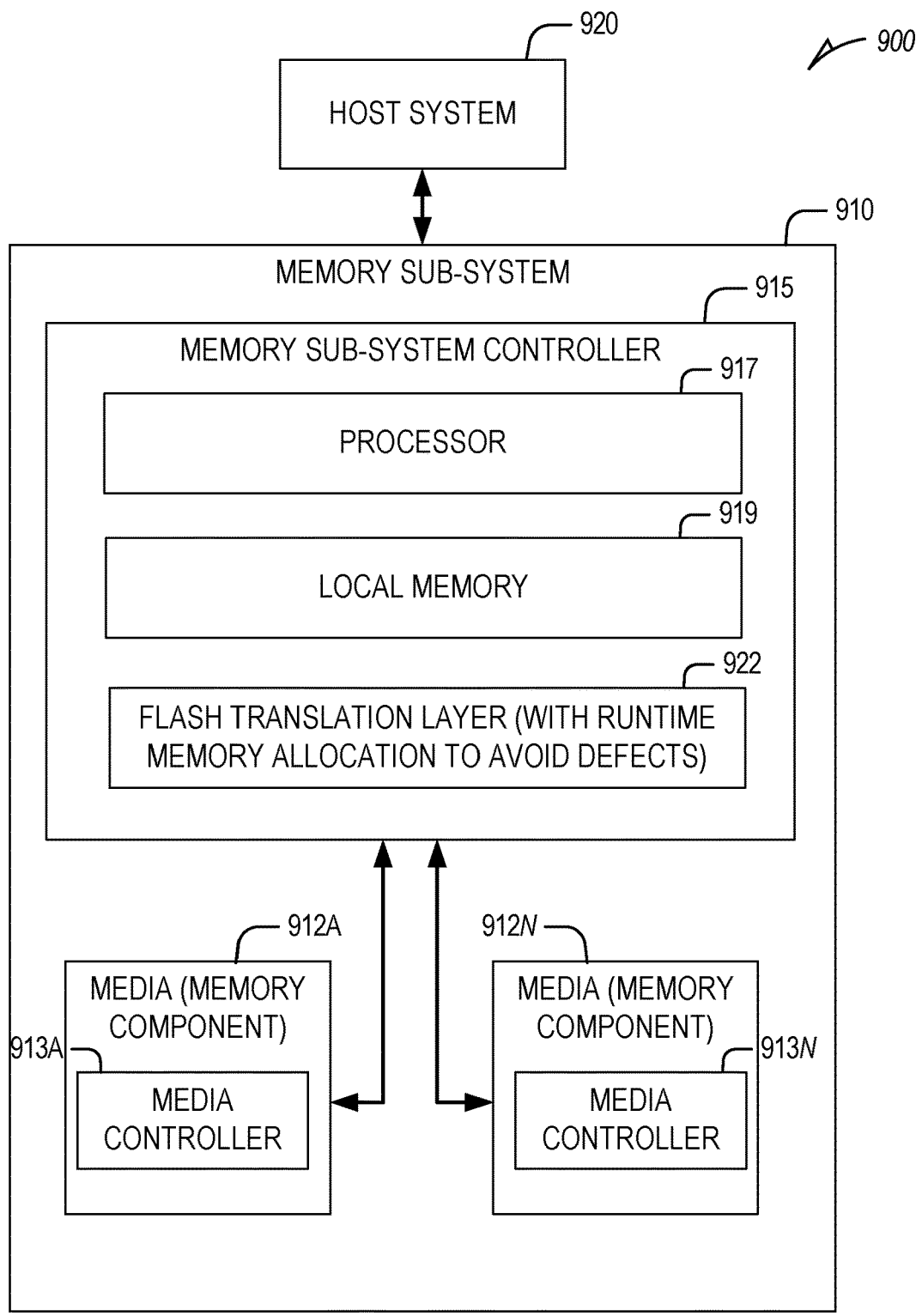
FIG. 9 is a block diagram illustrating an example computing environment including a memory sub-system, in accordance with some embodiments of the present disclosure.

FIG. 9 illustrates an example computing environment 900 including a memory sub-system 910, in accordance with some examples of the present disclosure. The memory sub-system 910 can include media, such as memory components 912A to 912N. The memory components 912A to 912N can be volatile memory devices, non-volatile memory devices, or a combination of such. In some embodiments, memory components 912A-912N comprise a NAND array. In some embodiments, the memory sub-system 910 is a storage system. An example of a storage system is an SSD. In some embodiments, the memory sub-system 910 is a hybrid memory/storage system. In general, the computing environment 900 can include a host system 920 that uses the memory sub-system 910. For example, the host system 920 can write data to the memory sub-system 910 and read data from the memory sub-system 910.

The host system 920 can be a computing device such as a desktop computer, laptop computer, network server, mobile device, or such computing device that includes a memory and a processing device. The host system 920 can include or be coupled to the memory sub-system 910 so that the host system 920 can read data from or write data to the memory sub-system 910. The host system 920 can be coupled to the memory sub-system 910 via a physical host interface. As used herein, "coupled to" generally refers to a connection between components, which can be an indirect communicative connection or a direct communicative connection (e.g., without intervening components), whether wired or wireless, including connections such as electrical, optical, magnetic, and so forth. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 920 and the memory sub-system 910. The host system 920 can further utilize an NVM Express (NVMe) interface to access the memory components 912A to 912N when the memory sub-system 910 is coupled with the host system 920 by the PCIe interface. The physical host interface can provide an interface for passing control, address, data, and other signals between the memory sub-system 910 and the host system 920.

The memory components 912A to 912N can include any combination of the different types of non-volatile memory components and/or volatile memory components. An example of non-volatile memory components includes a negative- and (NAND)-type flash memory. Each of the memory components 912A to 912N can include one or more arrays of memory cells such as single-level cells (SLCs) or multi-level cells (MLCs) (e.g., TLCs or QLCs). In some embodiments, a particular memory component can include both an SLC portion and an MLC portion of memory cells. Each of the memory cells can store one or more bits of data (e.g., data blocks) used by the host system 920. Although non-volatile memory components such as NAND-type flash memory are described, the memory components 912A to 912N can be based on any other type of memory, such as a volatile memory. In some embodiments, the memory components 912A to 912N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 912A to 912N can be grouped as memory pages or data blocks that can refer to a unit of the memory component used to store data.

The memory sub-system controller 915 can communicate with the memory components 912A to 912N to perform operations such as reading data, writing data, or erasing data at the memory components 912A to 912N and other such operations. The memory sub-system controller 915 can include hardware such as one or more integrated circuits and/or discrete components, a buffer memory, or a combination thereof. The memory sub-system controller 915 can be a microcontroller, special-purpose logic circuitry (e.g., a field programmable gate array (FPGA), an application specific integrated circuit (ASIC), etc.), or another suitable processor. The memory sub-system controller 915 can include a processor (processing device) 917 configured to execute instructions stored in local memory 919. In the illustrated example, the local memory 919 of the memory sub-system controller 915 includes an embedded memory configured to store instructions for performing various processes, operations, logic flows, and routines that control operation of the memory sub-system 910, including handling communications between the memory sub-system 910 and the host system 920. In some embodiments, the local memory 919 can include memory registers storing memory pointers, fetched data, and so forth. The local memory 919 can also include read-only memory (ROM) for storing microcode. While the example memory sub-system 910 in FIG. 9 has been illustrated as including the memory sub-system controller 915, in another embodiment of the present disclosure, a memory sub-system 910 may not include a memory sub-system controller 915, and can instead rely upon external control (e.g., provided by an external host, or by a processor or controller separate from the memory sub-system).

In general, the memory sub-system controller 915 can receive commands or operations from the host system 920 and can convert the commands or operations into instructions or appropriate commands to achieve the desired access to the memory components 912A to 912N. The memory sub-system controller 915 can be responsible for other operations such as wear leveling operations, garbage collection operations, error detection and error-correcting code (ECC) operations, encryption operations, caching operations, and address translations between a logical block address and a physical block address that are associated with the memory components 912A to 912N. The memory sub-system controller 915 can further include host interface circuitry to communicate with the host system 920 via the physical host interface. The host interface circuitry can convert the commands received from the host system 920 into command instructions to access the memory components 912A to 912N as well as convert responses associated with the memory components 912A to 912N into information for the host system 920.

The memory sub-system 910 can also include additional circuitry or components that are not illustrated. In some embodiments, the memory sub-system 910 can include a cache or buffer (e.g., DRAM) and address circuitry (e.g., a row decoder and a column decoder) that can receive an address from the memory sub-system controller 915 and decode the address to access the memory components 912A to 912N.

Any one of the memory components 912A to 912N can include a media controller (e.g., media controller 913A and media controller 913N) to manage the memory cells of the memory component, to communicate with the memory sub-system controller 915, and to execute memory requests (e.g., read or write) received from the memory sub-system controller 915.

The memory sub-system 910 includes a flash translation layer 922 that performs or facilitates operations for runtime memory allocation to avoid defects as described herein. The flash translation layer 922 can translate the upper file system read and write commands and manage internal memory data layout for storage. The flash translation layer 922 supports address translation, also known as logical to physical address mapping that changes logical address from the file system to physical address in flash memory. The flash translation layer 922 can redirect each write request to an empty area of flash memory, thereby avoiding the "erase-before write" limitation of flash memory. This redirection can involve allocation of particular erase groups as described herein. Additionally, flash translation layer 922 can assist in various memory management processes including garbage collection, wear-leveling, bad block management, error control functions, among others. Such operations can be tracked to determine memory conditions and associated allocation criteria as described herein using flash translation layer 922. The flash translation layer 922 can further provide power-off recovery to save the data structures and maintain data consistency in case of a sudden power-off during operation.

In some embodiments, the controller 915 includes at least a portion of the flash translation layer 922. For example, the controller 915 can include a processor 917 (processing device) configured to execute instructions stored in local memory 919 for performing the operations described herein. In some embodiments, the memory allocation aspects are implemented as part of the host system 920, such as a software application or an operating system on the host system 920. Some such embodiments can particularly operate where host system 920 is connected to disaggregated memory (e.g. a NAND array) with the host performing operations for allocating memory in accordance with embodiments described herein.

According to some embodiments, the memory sub-system 910 can receive, from the host system 920, a request to write data (e.g., host/user data) to the memory components 912A to 912N. In response to the request, flash translation layer 922 can cause the memory sub-system controller 915 to allocate erase groups within media 912, including any needed erase operations, to write the data to a set of data blocks of the memory components 912A to 912N which make up the allocated erase group. Additionally, in response to the request, the controller 915 can update data associated with memory conditions that can cause the flash translation layer 922 to transition to a new set of criteria for selecting erase groups in response to a subsequent request for memory resources and an associated allocation. Depending on the embodiment, the tracking data associated with various memory conditions can be saved in reserved memory space of the memory sub-system 910, which can be provided by the memory components 912A to 912N or the local memory 919. The tracking data can comprise a data structure that can implement one or more counters that track memory conditions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROMRAM, magnetic disk storage media, optical storage media, flash memory components, etc.

In the foregoing specification, embodiments of the disclosure have been described with reference to specific example embodiments thereof. It will be evident that various modifications can be made thereto without departing from other embodiments that are apparent from the disclosure as set forth in the following claims. The specification and drawings are, accordingly, to be regarded in an illustrative sense rather than a restrictive sense.

What is claimed is:

1. A method for allocating memory resources comprising:
   assigning, by one or more processors, a plurality of memory blocks of a memory sub-system to a plurality of erase groups, such that each erase group of the plurality of erase groups comprises two or more memory blocks of the plurality of memory blocks;
   determining, using the one or more processors, bad block associations for the plurality of erase groups;
   allocating, by the one or more processors prior to a memory condition being met that comprises a first erase group having more than a threshold number of write/erase actions, memory resources of the memory sub-system by erase group based on a first set of criteria, wherein the first set of criteria is based, at least in part, on the bad block associations for each erase group to prioritize erase groups with fewer bad blocks;
   determining, by the one or more processors, that the memory condition as been met as part of operation of the memory sub-system; and
   allocating, by the one or more processors based on the memory condition being met, the memory resources of the memory sub-system by erase group according to a second set of criteria, wherein the second set of criteria allocates the memory resources irrespective of the bad block associations for each erase group.

2. The method of claim 1, wherein each erase group comprises a redundant array of independent NAND (RAIN) stripe.

3. The method of claim 1, further comprising:
   identifying, using the one or more processors, bad blocks of the plurality of memory blocks in the memory sub-system prior to assigning the plurality of memory blocks to the plurality of erase groups, wherein the plurality of memory blocks are assigned to the plurality of erase groups to achieve a target bad block distribution among the plurality of erase groups.

4. The method of claim 1, wherein the first set of criteria comprises allocating a first available erase group with no bad blocks and a first write/erase count over a second available erase group with at least one bad block and a second write/erase count that is smaller than the first write/erase count.

5. The method of claim 1, wherein the memory condition further comprises one or more of:
   a threshold number of power cycles;
   a threshold power-on time; and
   a time since initial use.

6. The method of claim 1, wherein the first set of criteria is associated with a fresh out of box (FOB) condition for the memory sub-system.

7. The method of claim 1, wherein the second set of criteria is associated with a steady state (SS) condition for the memory sub-system.

8. The method of claim 1, wherein each erase group comprises an erasure coding group.

9. The method of claim 1, wherein the one or more processors comprise processing circuitry of a memory controller coupled to a plurality of memory components in a memory sub-system, wherein each memory component comprises a NAND die.

10. A system for runtime memory allocation to avoid memory defects, system comprising:
    a plurality of memory devices; and
    a processing device communicatively coupled to the plurality of memory devices and configured to:
        manage had block identifiers, wherein the bad block identifiers identify one or more blocks of a plurality of memory blocks having defects rendering the one or more blocks unusable for storing data;
        manage arrangement of the plurality of memory blocks into a plurality of erase groups, wherein each erase group of the plurality of erase groups comprises two or more memory blocks of the plurality of memory blocks;
        determine a number of bad blocks for each erase group of the plurality of erase groups;
        allocate, prior to a first memory condition that comprises an erase group having more than a threshold number of write/erase actions occurring, a first erase group for erasure based on a first set of criteria comprising the number of bad blocks for each erase group;
        based on the first memory condition being met, transitioning from the first set of criteria to a second set of criteria different from the first set of criteria; and
        allocate a second erase group for erasure based on the second set of criteria.

11. The system of claim 10, wherein the processing device is further configured to identify bad blocks of the plurality of memory blocks in the memory sub-system prior to assigning the plurality of memory blocks to the plurality of erase groups, wherein the plurality of memory blocks are assigned to the plurality of erase groups to achieve a target bad block distribution among the plurality of erase groups.

12. The system of claim 10, wherein the first memory condition comprises no erase blocks with no bad blocks being available for allocation.

13. The system of claim 12, wherein the first memory condition further comprises all available erase groups being used for data storage.

14. The system of claim 13, wherein the first memory condition further comprises a threshold associated with avoiding an unrecoverable wear leveling condition.

15. A non-transitory computer-readable medium comprising instructions that, when executed by one or more processors of a device, cause the device to perform operations comprising:
    assigning a plurality of memory blocks of a memory sub-system to a plurality of erase groups, such that each erase group of the plurality of erase groups comprises two or more memory blocks of the plurality of memory blocks;

calculating a bad block association for each erase group of the plurality of erase groups;

allocating, prior to a memory condition that comprises a first erase group having more than a threshold number of write/erase actions being met, memory resources of the memory sub-system by erase group based on a first set of criteria, wherein the first set of criteria is based at least in part on the bad block association for each erase group in order to prioritize use of erase groups with fewer bad blocks;

determining that the memory condition has been met as part of operation of the memory sub-system; and allocating, based on the memory condition being met, the memory resources of the memory sub-system by erase group according to a second set of criteria, wherein the second set of criteria allocates the memory resources irrespective of the bad block association for each erase group after the determining that the memory condition has been met.

16. The non-transitory computer-readable medium of claim 15, wherein the memory condition comprises one or more of:

no erase blocks with no bad blocks being available for allocation;

all available erase groups being used for data storage; or a threshold associated with avoiding an unrecoverable wear leveling condition.

17. The non-transitory computer-readable medium of claim 15, wherein:

the allocating of the memory resources based on the first set of criteria comprises allocating a first available erase group with no bad blocks and a first write/erase count over a second available erase group with at least one bad block and a second write/erase count that is smaller than the first write/erase count; and wherein the memory condition comprises one or more of:

a determination that no erase groups without bad blocks are available for allocation or a determination that the memory sub-system has been fully saturated with all available erase groups used for data storage.

18. The non-transitory computer-readable medium of claim 15, wherein each erase group comprises a redundant array of independent NAND (RAIN) stripe.

19. The non-transitory computer-readable medium of claim 15, wherein the operations further comprise:

identifying bad blocks of the plurality of memory blocks in the memory sub-system prior to assigning the plurality of memory blocks to the plurality of erase groups, wherein the plurality of memory blocks are assigned to the plurality of erase groups to achieve a target bad block distribution among the plurality of erase groups.

20. The non-transitory computer-readable medium of claim 15, wherein the first set of criteria comprises allocating a first available erase group with no bad blocks and a first write/erase count over a second available erase group with at least one bad block and a second write/erase count that is smaller than the first write/erase count.

* * * * *